US007015666B2

(12) United States Patent
Staus

(10) Patent No.: US 7,015,666 B2
(45) Date of Patent: Mar. 21, 2006

(54) DEVICE FOR SENSING AN OBSTACLE IN THE OPENING RANGE OF A CLOSURE ELEMENT OF A MOTOR VEHICLE

(75) Inventor: Steffen Staus, Lindau (DE)

(73) Assignee: Metzler Automotive Profile Systems GmbH, Lindau (DE)

( * ) Notice: Subject to any disclaimer, the term of this patent is extended or adjusted under 35 U.S.C. 154(b) by 415 days.

(21) Appl. No.: 10/430,760

(22) Filed: May 6, 2003

(65) Prior Publication Data

US 2004/0017171 A1    Jan. 29, 2004

(30) Foreign Application Priority Data

May 7, 2002    (DE)    ............................... 102 20 725

(51) Int. Cl.
  *B60J 10/02*    (2006.01)
(52) U.S. Cl. .................. 318/286; 388/903; 73/774; 49/27; 324/688
(58) Field of Classification Search ............... 318/280, 318/286, 434, 466–469; 388/903; 73/763, 73/774, 780; 49/26–28; 324/658, 686, 688; 361/271, 272
  See application file for complete search history.

(56) References Cited

U.S. PATENT DOCUMENTS

| 5,023,418 | A | | 6/1991 | Beckhausen |
| 5,166,679 | A | | 11/1992 | Vranish et al. |
| 5,621,290 | A | * | 4/1997 | Heller et al. ............ 318/466 |
| 6,158,170 | A | * | 12/2000 | Brodowsky ............ 49/28 |
| 6,337,549 | B1 | * | 1/2002 | Bledin ............ 318/466 |
| 6,348,862 | B1 | | 2/2002 | McDonnell et al. |
| 6,373,005 | B1 | | 4/2002 | Griesbach et al. |
| 6,377,009 | B1 | * | 4/2002 | Philipp ............ 318/468 |
| 6,750,624 | B1 | * | 6/2004 | Haag et al. ............ 318/467 |

(Continued)

FOREIGN PATENT DOCUMENTS

DE    199 13 105 A1    10/2000

(Continued)

OTHER PUBLICATIONS

English Language Abstract of DE 299 21 958 U1.

(Continued)

*Primary Examiner*—Bentsu Ro
(74) *Attorney, Agent, or Firm*—Stephen B. Salai, Esq.; Brian B. Shaw, Esq.; Harter, Secrest & Emery LLP

(57) ABSTRACT

A device for sensing an obstacle in said opening range of an automotive closure element movable between an open position and and closed position, more particularly an electrically powered door window (20) or sunroof is provided with a weatherseal (30) sealing the window pane (20). The weatherseal (30) is made of an elastomeric material and secured to a frame (12) of the motor vehicle (10). The device comprises in addition a sensor for sensing an obstacle in the opening range of the closure element (20), the sensor comprising at least one electrical conductor (40) generating an electrical field (F) in the opening range of the closure element (20).

The device achieves by simple ways and means an engineered orientation of the electrical field such that any interference by the closure element (20) to the capacitive change in the electrical field (F) is precluded by reason of conductive means (50) comprising a conductive surface (51) made of an electrically conductive material. The conductive means (50) are electrically insulated and shield the window pane (20) from the electrical field (F) generated by the electrical conductor (40).

12 Claims, 5 Drawing Sheets

U.S. PATENT DOCUMENTS 6,782,759 B1 * 8/2004 Shank et al. .................. 73/780

FOREIGN PATENT DOCUMENTS

| DE | 29921958 U1 | 4/2001 |
| EP | 0 648 628 B1 | 4/1995 |
| EP | 0648628 A1 | 4/1995 |
| EP | 0856425 A1 | 8/1998 |
| EP | 1 154 110 A2 | 11/2001 |
| EP | 1154110 A2 | 11/2001 |

OTHER PUBLICATIONS

English Language Abstract of EP 0856425.

Jorg Ublein, Trapping protector for power windows by means of influencing an electric field, Thesis, Mar. 1992, 7 pages, Fachhochschule Coburg, Germany.

Translation of relevant pages of above thesis, 4 pages.

Horst Niehus, Experimental physics Il, Electricity 1, Lecture Series 1.15, 2003, 5 pages, Humboldt University Berlin, Faculty of Mathematics, Berlin, Germany.

Translation of relevant pages of above lecture, 5 pages.

* cited by examiner

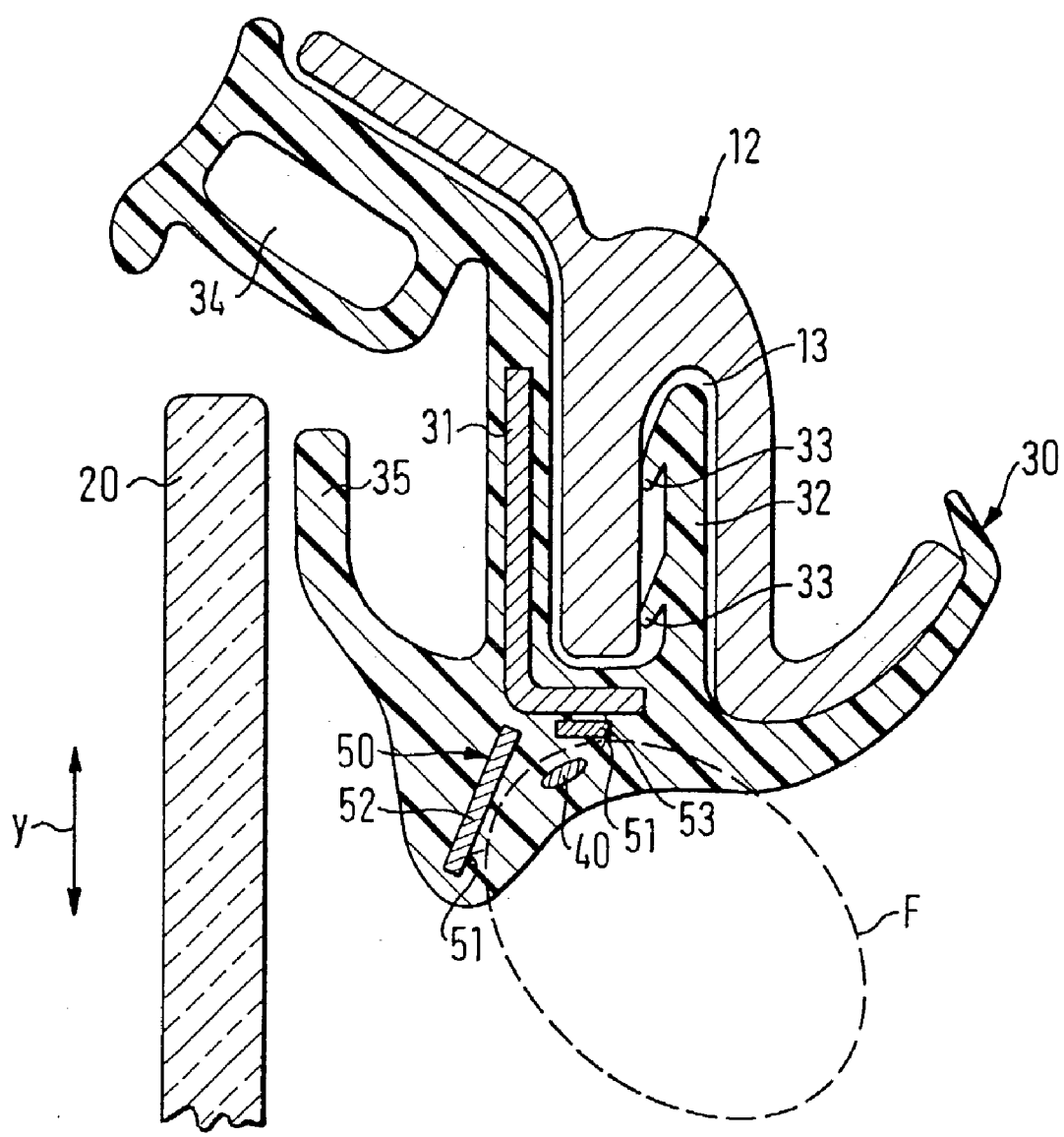

DEVICE FOR SENSING AN OBSTACLE IN THE OPENING RANGE OF A CLOSURE ELEMENT OF A MOTOR VEHICLE

CROSS-REFERENCE TO RELATED APPLICATIONS

This application claims priority of German Patent Application Number 102 20 725.9, filed May 7, 2002.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The invention relates to a device for sensing an obstacle in the opening range of an automotive closure element movable between an open position and closed position, more particularly an electrically powered door window or sunroof. The device is provided for sensing an obstacle in the opening range of the closure element with a sensor comprising at least one electrical conductor generating an electrical field in the opening range of the closure element.

2. Background Art

Devices of this kind are trapping protectors serving to prevent part of the human body being trapped, for instance, between a powered door window and at least some part of the edge surrounding the window. For this purpose known devices feature a sensor which senses the presence of an obstacle in the opening range of the window representing the closure element and furnishes a signal controlling the motor powering the window. As regards the function of the sensor a distinction is made between trapping protectors requiring physical contact with the obstacle and trapping protectors working by proximity (non-contact) sensing.

One such trapping protector belonging to the first group is described, for example, in DE 199 13 105 A1. This known device comprises a weatherseal sealing a closure element and is engineered with two electrically conductive portions spaced away from each other. When physical contact occurs with an obstacle in the opening range of the closure element the electrically conductive portions are pressed together, resulting in a switching contact which triggers an electrical control signal.

A proximity-type trapping protector is disclosed in EP 0 648 628 B1. This known device comprises an electrical conductor which generates an electrical field in the opening range of a powered window pane. The presence of an obstacle results in a change in the dielectric constant in the opening range which becomes evident by a change in frequency, phase or amplitude of an oscillating circuit generating the electrical field through the conductor. This change is analyzed to generate a signal for controlling the motor powering the window. The conductor emitting the electrical field is arranged on a weatherseal sealing the window pane whilst serving to strengthen the weatherseal.

Known from EP 1 154 110 A2 is a proximity or non-contact type trapping protector. The way in which this trapping protector works is based on a change in capacitance of an electrical field generated between two electrical conductors prompted by an electrically conducting obstacle. One of the two conductors, the sensor electrode, is integrated in a weatherseal sealing the closure element and receives a predefined electric charge. It is in this way that between the sensor electrode and the other conductor, the basic electrode which is for example an automotive frame to which the weatherseal is secured, a reference capacitance can be defined, a change in which caused by an obstacle triggers a signal for controlling the motor powering the closure element. The basic electrode may also be formed by a conductor likewise integrated in the weatherseal. The effect of the electrical field in this case depends on the arrangement of the sensor electrode with respect to the basic electrode.

Experience has shown that the disadvantage of this known device is that movement of the closure element is evident as an interference to the reference capacitance. Although this nuisance can be compensated by an electronic circuit this is relatively complicated. Apart from this, orienting the electrical field by a suitable arrangement of sensor electrode and basic electrode has proven to be unsatisfactory, since although this enables the interference by the closure element to be reduced, it still cannot be eliminated completely.

BRIEF SUMMARY OF THE INVENTION

The invention is based on the objective of sophisticating a device of the aforementioned kind so that the electrical field can now be simply oriented to preclude interference of the change in capacitance in the electrical field by the closure element.

To achieve this objective there is now provided in a device having the aforementioned features as it reads from claim 1 conductive means comprising a conductive surface area consisting of an electrically conductive material, the conductive means being electrically insulated and shielding the closure element from the electrical field generated by the electrical conductor.

A device configured as such is based on having discovered that providing the conductive means is a simple solution to orienting the electrical field to a zone in the opening range of the closure element in which the closure element cannot prove to be a disturbance. In accordance with the invention this is now made possible by the conductive means shielding the closure element from the electrical field generated by the electrical conductor. For this purpose it is necessary that the conductive means comprises a conductive surface area acting as the shield made of an electrically conductive material, for example, metal. To ensure effective shielding it is in addition necessary that the conductive means are located electrically insulated so as not to detriment determining the reference capacitance resulting between the electrical conductor or sensor electrode and a basic electrode, for example, the frame of the motor vehicle. Providing the conductive means now eliminates the need to sense the kinematics of the closure element. Thus, unlike prior art, a relatively complicated electronic compensating circuit can now be dispensed with.

Advantageous aspects of the device in accordance with the invention read from the claims 2 to 11.

Thus, to faciliate assembly it is of advantage to provide the conductive means on a weatherseal of the closure element made of an elastomeric material and secured to the frame of the vehicle. In addition, it is particularly of advantage when the conductive means is a metallic insert embed ded in the weatherseal. The metallic insert can be integrated in the weatherseal ready for production for example by coextrusion. Expediently the metallic insert is a plate so that a relatively large conductive surface area and thus good shielding of the closure element is attainable. Depending on the application it may furthermore prove to be expedient to provide one or more such plastics material to achieve an engineered orientation of the electrical field.

To advantage, the conductive means are formed by strengthening the weatherseal, it being usual that a weatherseal made of an elastomeric material such as for example ethylene propylene diene rubber (EPDM) includes a carrier inlay to provide the stiffness necessary for securing it to the frame. By suitably arranging the carrier, made of metal as a rule, it is possible to simultaneously exploit the carrier as the conductive means for shielding the closure element.

As an alternative, in one preferred further embodiment of the device in accordance with the invention the conductive means may form an electrically conductive portion of the weatherseal. Such a portion can be produced relatively simply, for example, by coextrusion.

In accordance with another alternative aspect of the device in accordance with the invention the conductive means are arranged on a trim item covering the frame and/or the weatherseal at least in part. Such trim usually finds application as a trim strip for added visual appeal in finishing. The conductive means may be embedded, for example, in the trim or, indeed, form the conductive means by itself.

To engineer the electrical field oriented to the zone of the opening range of the closure element in which an obstacle could occur, the weatherseal and/or the trim are preferably made of a material featuring a relatively high dielectric constant so that the relative permittivity of the weatherseal assists in engineering the orientation of the electrical field.

Preferably the conductive means are arranged in the region of the electrical conductor to make for a compact configuration.

In conclusion, in yet another aspect of the device in accordance with the invention it is proposed that the sensor comprises a grounded electrical conductor serving as the opposing electrode for engineering orientation of the electrical field.

BRIEF DESCRIPTION OF THE SEVERAL VIEWS OF THE DRAWING(S)

The device in accordance with the invention and its further advantages will now be detailed by way of describing preferred example embodiments with respect to the drawings illustrated therein merely diagrammatically in which:

FIG. 2c is a sectional view as shown in FIG. 2a but showing a third embodiment of the device in accordance with the invention;

DETAILED DESCRIPTION OF THE INVENTION

Figure 1:
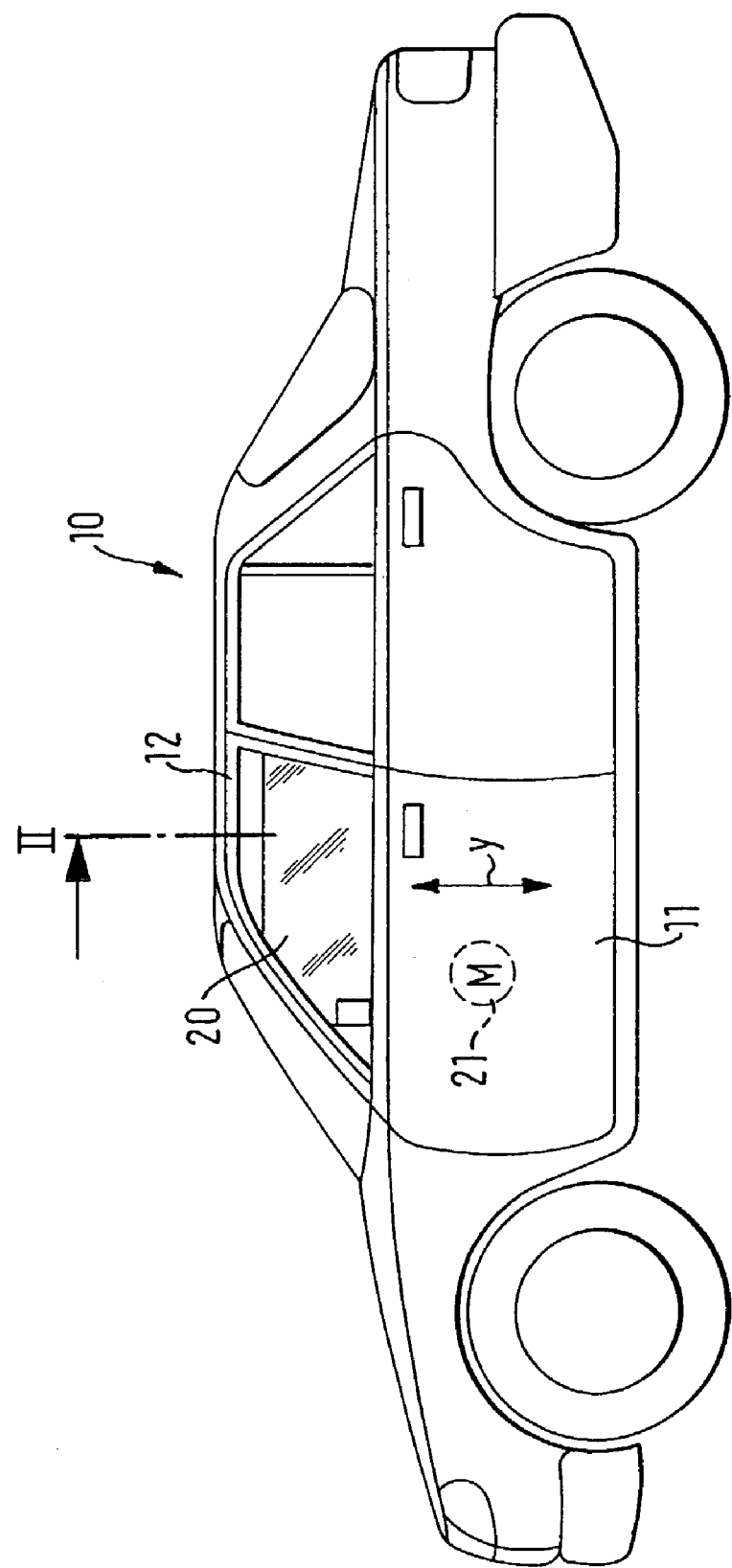
FIG. 1 is a sectional view of a motor vehicle.

Referring now to FIG. 1 there is illustrated a motor vehicle 10 provided in the region of a front door 11 with a window pane 20 powered by an electric motor 21. The window pane 20 representing a closure element is powered in the direction y of the electric motor 21 between an open position and its closed position.

As evident from FIGS. 2a to 2d the front door 11 comprises a metal frame 12 to which a weatherseal 30 seals the window pane 20. The weatherseal 30 is made of an elastomeric material, for example ethylene propylene diene rubber (EPDM), and provided with a metallic carrier 31 to enhance its stiffness. In addition, the weatherseal 30 comprises a fastening section 32 extending along a channel 13 of the frame 12 and provided with retaining lip 33 for locating the weatherseal 30. In addition, the weatherseal 30 is provided with a cavity 34 and sealing lips 35 for guiding and sealing the window pane 20.

Furthermore, there is embedded in the weatherseal 30 an electrical conductor 40 representing a sensor electrode as is described in EP 1 154 110 A2, as a result of which the electrical conductor 40 serves to generate an electrical field F, the grounded frame 12 or some other grounded conductor forming the needed opposing electrode. An analyzer (not shown) senses the change in the capacitance caused by an electrically conductive obstacle in the region of the electrical field F in the electrical conductor 40 and furnishes as a function of the change a signal for controlling the electric motor 21 which halts the electric motor 21, when necessary.

As illustrated in FIGS. 2a to 2d the window pane 20 is shielded from the electrical field F by conductive means 50 so that the window pane 20 does not interfere with the reference capacitance of the electrical field F. Without being shielded the window pane 20 would continually cause a change in the dielectric constant in the opening range of the window pane 20 when powered. As in prior art this would necessitate compensating this interference by the window pane 20 on the reference capacitance by including a suitable electronic circuit. In the device as shown in FIGS. 2a to 2d such a compensating circuit is eliminated since the electrical field F is practically isolated from the window pane 20 by the conductive means 50. For this purpose the conductive means 50 comprise a conductive surface 51 for engineered orientation of the electrical field F such that the electrical field F extends in a partial area of the opening range of the electric motor 21. In this arrangement the partial area is preferably restricted to the danger zone in which sensing an obstacle for reliable guarding is mandatory.

Figure 2A:
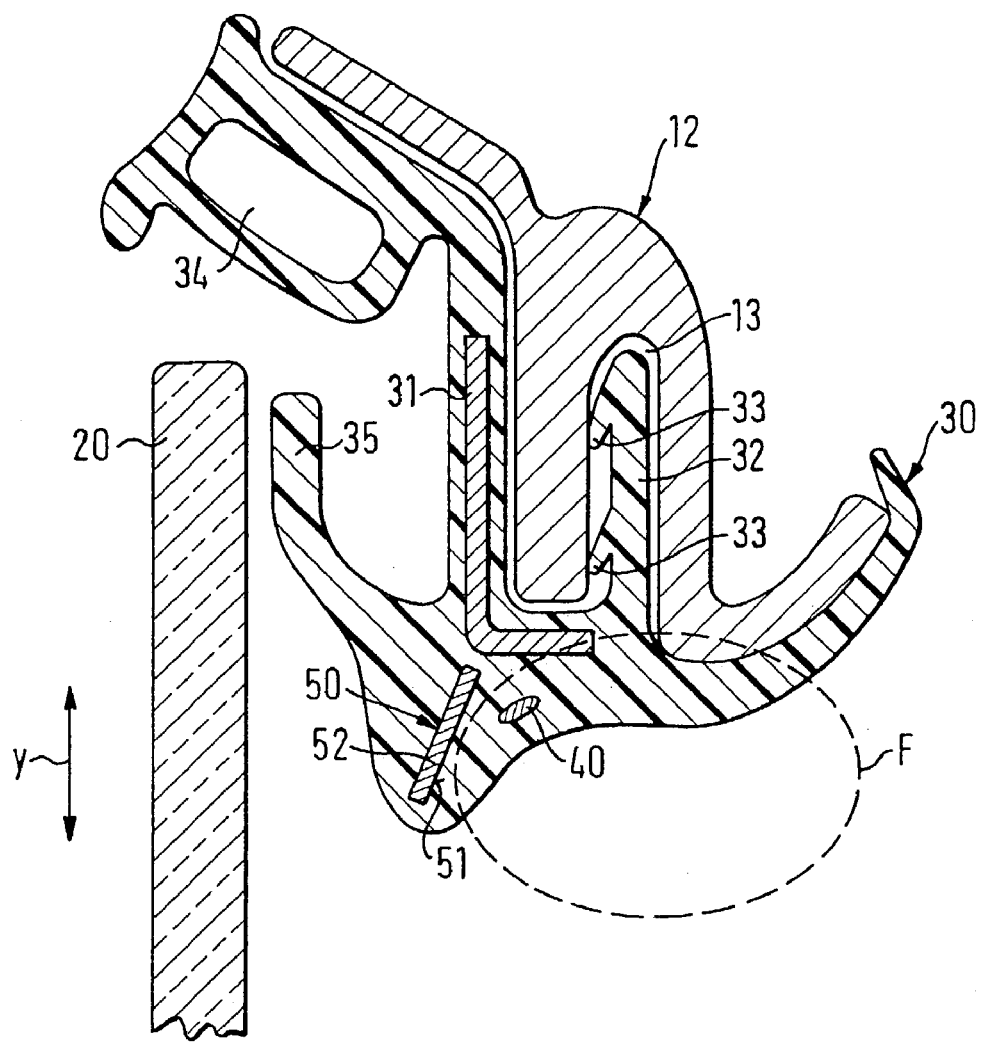
FIG. 2a is a sectional view taken along the line II in FIG. 1 showing a first embodiment of the device in accordance with the invention.

The embodiments as shown in FIGS. 2a to 2d differ by the configuration of the conductive means 50. In the embodiment as shown in FIG. 2a the conductive means 50 are a metallic plate inlay 52 embedded in the weatherseal 30. The weatherseal 30 results in the inlay 52 being electrically insulated and in thus ensuring that the reference capacitance as sensed at the electrical conductor 40 is practically constant.

Figure 2B:
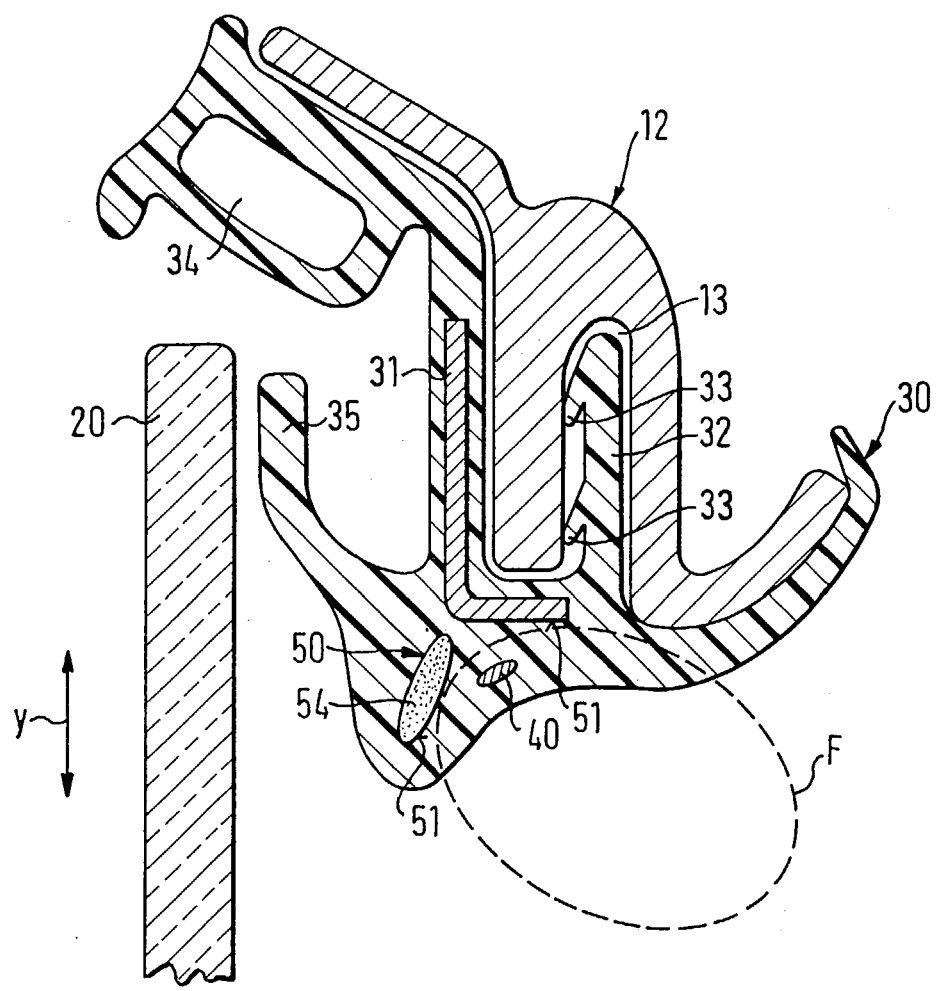
FIG. 2b is a sectional view as shown in FIG. 2a but showing a second embodiment of the device in accordance with the invention.

The embodiment as shown in FIG. 2b differs from the device as evident from FIG. 2a, for one thing, by an electrically conductive portion 54 of the weatherseal 30 being provided instead of the inlay 52. For another, the carrier 31 is electrically insulated so that it has an electrical potential counteracting propagation of the electrical field F. Accordingly, the carrier 31 contributing towards engineering orientation of the electrical field F is a component of the conductive means 50.

By contrast, the embodiment as shown in FIG. 2c features two metallic inlays 52, 53 embedded in the vicinity of the electrical conductor 40 in the weatherseal 30. These inlays 52, 53 engineer orientation of the electrical field F so that the window pane 20 is shielded.

Figure 2D:
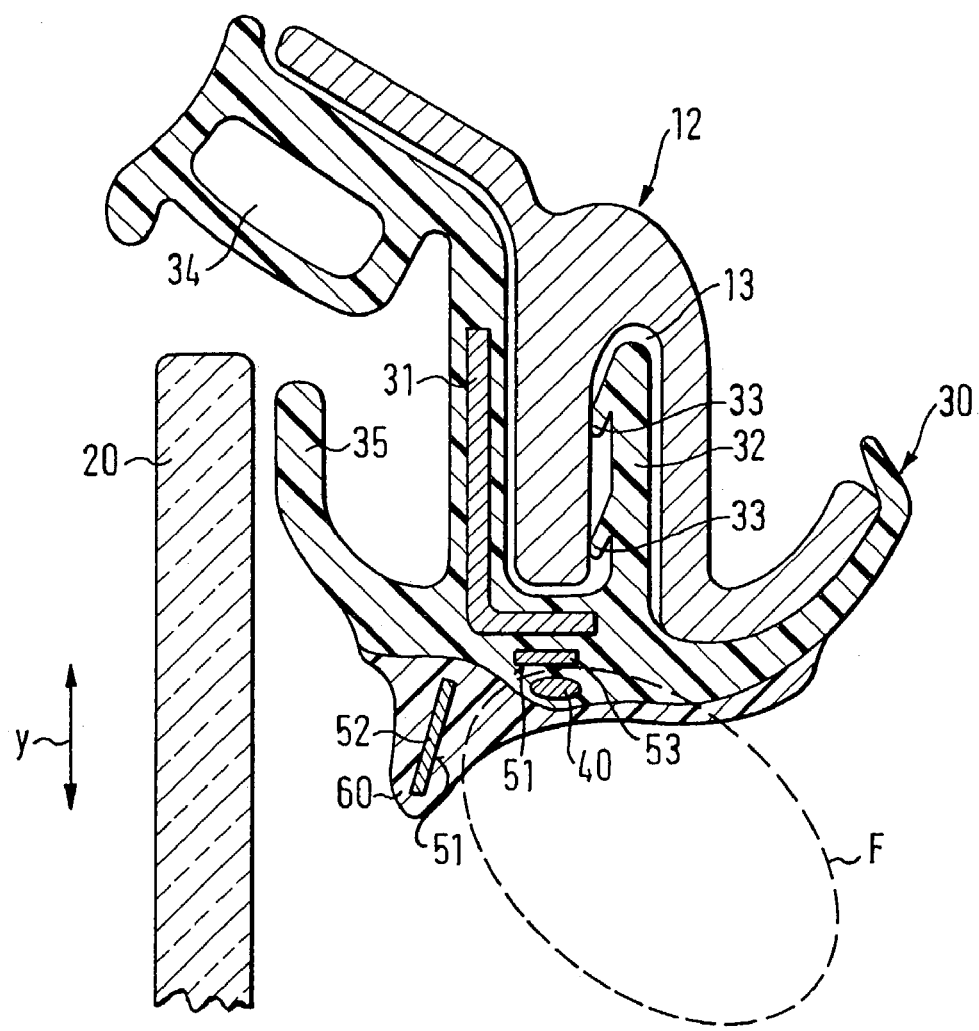
FIG. 2d is a sectional view as shown in FIG. 2a but showing a fourth embodiment of the device in accordance with the invention.

The embodiment as shown in FIG. 2d comprises a trim 60 made of plastics material which is secured to the weatherseal 30. The trim 60 serves as a trim strip concealing the weatherseal 30 at least in part for enhanced visual appeal of the finish. As compared to the embodiment shown in FIG. 2c the inlay 52 is integrated in the trim 60, whereas the inlay 53 remains embedded in the weatherseal 30. The electrical field F is influenced by the relative permittivity of the material from which the weatherseal 30 and trim 60 are made. Accordingly, suitable selecting these materials engineers orientation of the electrical field F.

The embodiments as described above for a device for sensing an obstacle in the opening range of the window pane 20 excel over convential trapping protectors by the electrical field F now being engineered orientated by means of the conductive means 50 which shield the window pane 20 from the electrical field F generated by the electrical conductor 40. The window pane 20 thus exerts no, or at the most a negligable, influence on the reference capacitance of the electrical field F so that there is now no need to take into account the movement of the window pane 20 is analyzing the change in capacitance of the electrical field F. Last but not least, the device as described above finds application not only as a trapping protector to prevent trapping by the window pane 20, but, of course, also for other automotive closure elements of the motor vehicle 10 such as, for example, a sunroof or a sliding door. The gist of the invention is simply that the closure element is shielded from the electrical field F by the conductive means 50.

The invention claimed is:

1. A device for sensing an obstacle in the opening range of a closure element of a motor vehicle, wherein said closure element is movable between an open position and a closed position, comprising a sensor including at least one electrical conductor generating an electrical field in the opening range of said closure element; and conductive means having a conductive surface area consisting of an electrically conductive material, said conductive means being electrically insulated and shielding said closure element from said electrical field generated by said electrical conductor.

2. The device as set forth in claim 1, comprising a weatherseal sealing said closure element, said weatherseal being made of an elastomeric material and secured to a frame of said motor vehicle, said conductive means being arranged on said weatherseal.

3. The device as set forth in claim 2, wherein said conductive means are a metallic inlay embedded in said weatherseal.

4. The device as set forth in claim 3, wherein said conductive means are formed by a carrier of said weatherseal.

5. The device as set forth in claim 2, wherein said conductive means form an electrically conductive portion of said weatherseal.

6. The device as set form in claim 1, in which said conductive means are arranged on a trim covering said frame at least in part.

7. The device as set forth in claim 1, in which said conductive means are arranged on a trim covering said weatherseal at least in part.

8. The device as set forth in claim 6, wherein said weatherseal is made of a material having a relatively high dielectric constant.

9. The device set forth in claim 6, wherein said trim is made of a material having a relatively high dielectric constant.

10. The device as set forth in claim 1, in which said conductive means are arranged in the region of said electrical conductor.

11. The device as set forth in claim 1, in which said sensor comprises a grounded electrical conductor serving as the opposing electrode.

12. A device for sensing an obstacle in the opening range of an automotive-closure element movable between an open position and a closed position, comprising at least one electrical conductor generating an electrical field in the opening range of said closure element, and a shield conductor having a surface area electrically insulated from and shielding said closure element from said electrical field generated by said electrical conductor.

* * * * *

UNITED STATES PATENT AND TRADEMARK OFFICE
CERTIFICATE OF CORRECTION

| | | |
|---|---|---|
| PATENT NO. | : 7,015,666 B2 | Page 1 of 1 |
| APPLICATION NO. | : 10/430760 | |
| DATED | : March 21, 2006 | |
| INVENTOR(S) | : Steffen Staus | |

It is certified that error appears in the above-identified patent and that said Letters Patent is hereby corrected as shown below:

On the cover page of the patent, "Metzler Automotive Profile Systems GmbH" should read -- Metzeler Automotive Profile Systems GmbH--

Signed and Sealed this

Eleventh Day of July, 2006

JON W. DUDAS
*Director of the United States Patent and Trademark Office*

(12) EX PARTE REEXAMINATION CERTIFICATE (7320th)
United States Patent
Staus

(10) Number: US 7,015,666 C1
(45) Certificate Issued: Jan. 12, 2010

(54) DEVICE FOR SENSING AN OBSTACLE IN THE OPENING RANGE OF A CLOSURE ELEMENT OF A MONITOR VEHICLE

(75) Inventor: Steffen Staus, Lindau (DE)

(73) Assignee: Metzeler Automotive Profile Systems GmbH, Lindau (DE)

Reexamination Request:
No. 90/009,135, May 6, 2008

Reexamination Certificate for:
Patent No.: 7,015,666
Issued: Mar. 21, 2006
Appl. No.: 10/430,760
Filed: May 6, 2003

Certificate of Correction issued Jul. 11, 2006.

(30) Foreign Application Priority Data
May 7, 2002 (DE) .......................... 102 20 725

(51) Int. Cl.
B60J 10/02 (2006.01)

(52) U.S. Cl. .................. 318/286; 324/688; 388/903; 49/27; 73/774

(58) Field of Classification Search .................. None
See application file for complete search history.

(56) References Cited

U.S. PATENT DOCUMENTS 6,499,359 B1 12/2002 Washeleski et al.

Primary Examiner—Anjan K. Deb

(57) ABSTRACT

A device for sensing an obstacle in said opening range of an automotive closure element movable between an open position and and closed position, more particularly an electrically powered door window (20) or sunroof is provided with a weatherseal (30) sealing the window pane (20). The weatherseal (30) is made of an elastomeric material and secured to a frame (12) of the motor vehicle (10). The device comprises in addition a sensor for sensing an obstacle in the opening range of the closure element (20), the sensor comprising at least one electrical conductor (40) generating an electrical field (F) in the opening range of the closure element (20).

The device achieves by simple ways and means an engineered orientation of the electrical field such that any interference by the closure element (20) to the capacitive change in the electrical field (F) is precluded by reason of conductive means (50) comprising a conductive surface (51) made of an electrically conductive material. The conductive means (50) are electrically insulated and shield the window pane (20) from the electrical field (F) generated by the electrical conductor (40).

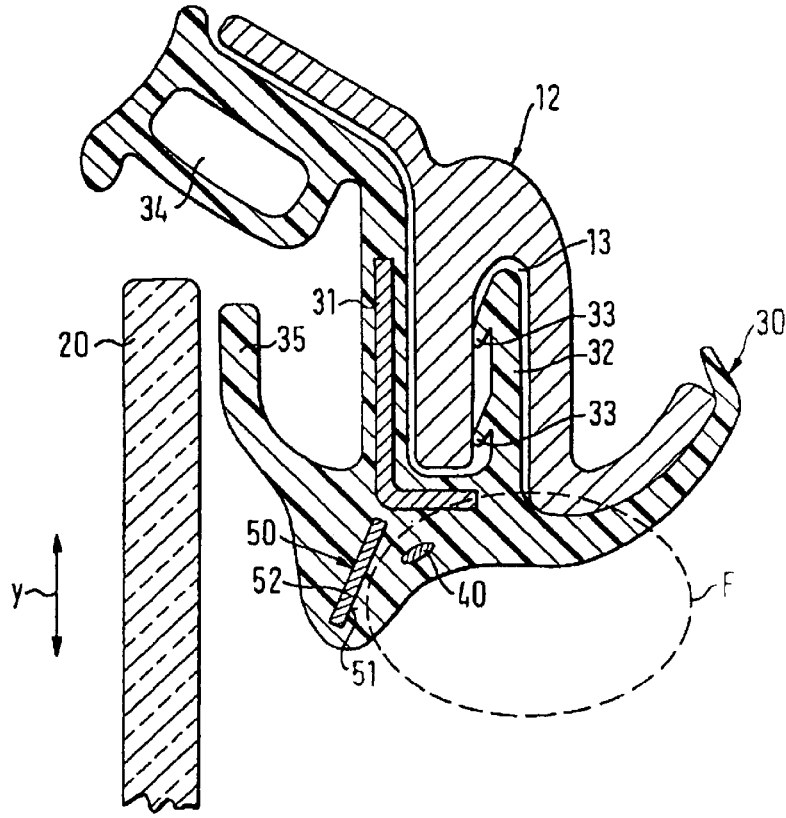

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–12 is confirmed.

* * * * *